United States Patent [19]

Bogar, Jr.

[11] Patent Number: 4,994,177

[45] Date of Patent: Feb. 19, 1991

[54] BAIT WELL WATER SPRAY AERATOR WITH VAST FILTERING CAPACITY

[76] Inventor: Earl M. Bogar, Jr., 6 Broad Oaks La., Houston, Tex. 77056

[21] Appl. No.: 379,620

[22] Filed: Jul. 14, 1989

[51] Int. Cl.⁵ ............................................ A01K 63/02
[52] U.S. Cl. ................................. 210/167; 210/416.2; 119/5; 43/56; 43/57
[58] Field of Search ...................... 210/169, 167, 416.2, 210/478, 497.01, 470, 455, 457; 43/56, 57

[56] References Cited

U.S. PATENT DOCUMENTS

| | | | |
|---|---|---|---|
| 3,295,681 | 1/1967 | Rubert et al. | 210/169 |
| 3,800,462 | 4/1974 | Coyle | 261/121.2 |
| 3,800,462 | 4/1974 | Coyle | 43/57 |
| 3,815,277 | 6/1974 | Murray | 43/57 |
| 4,255,360 | 3/1981 | Jeffries | 261/121.2 |
| 4,255,360 | 3/1981 | Jeffries | 261/5 |
| 4,353,846 | 10/1982 | Mehrens et al. | 61/4 |
| 4,757,636 | 7/1988 | Gambourn | 43/57 |
| 4,936,043 | 6/1990 | Steele | 43/57 |

*Primary Examiner*—Richard V. Fisher
*Assistant Examiner*—Robert A. Simpson

*Attorney, Agent, or Firm*—Fleit, Jacobson, Cohn, Price, Holman & Stern

[57] ABSTRACT

A bucket-type shaped container including a removable top and downwardly facing suction cups is provided for disposition within and suction cup support from the bottom of a reservoir containing water and bait. The side walls of the container include a large number of water inlet openings formed therein and a flexible panel of filtering material is formed into generally cylindrical configuration and snugly telescoped within the container. A flexible resilient panel member is flexed into generally cylindrical configuration with overlapped ends and is telescoped into the cylindrical filter panel and includes openings formed therethrough registered with the container wall openings, the flexible panel member exerting an outward biasing force on the filter panel. An electric motor powered submersible pump is wholly contained within the container and includes an inlet within the container and an outlet conduit which extends outwardly of the container and includes an outlet end within the associated receptacle above the water level therein and equipped with water sprayed discharge structure for discharging jets of water therefrom downwardly onto the surface of the water within the receptacle exteriorly of the container.

15 Claims, 1 Drawing Sheet

U.S. Patent  Feb. 19, 1991  Sheet 1 of 1  4,994,177
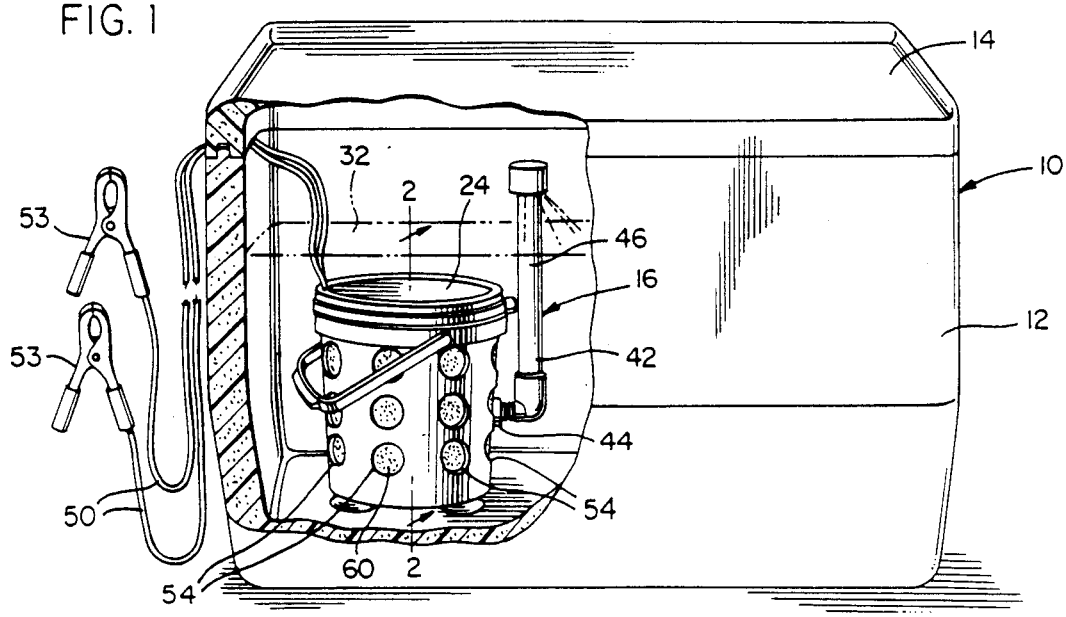
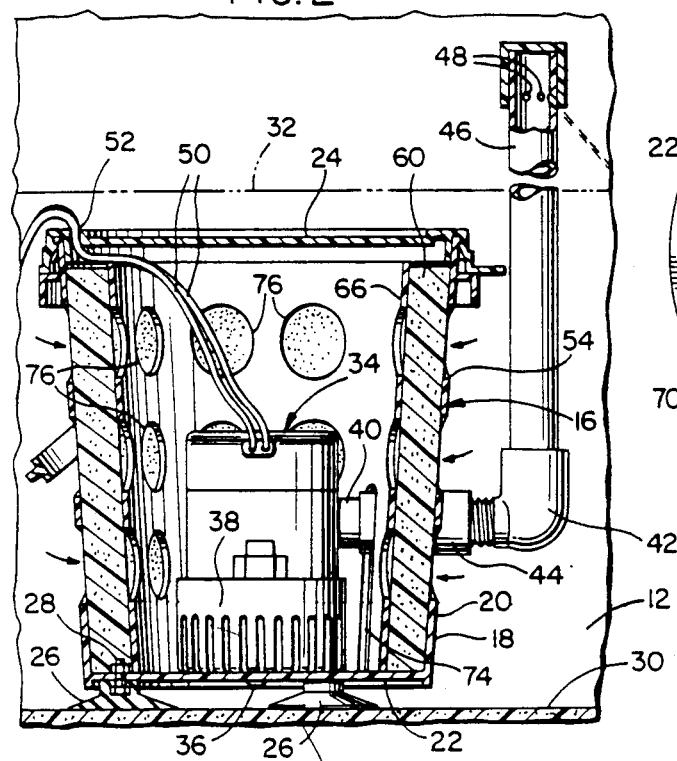

BAIT WELL WATER SPRAY AERATOR WITH VAST FILTERING CAPACITY

BACKGROUND OF THE INVENTION

1. Field of the Invention

This invention relates to a container for reception within a reservoir having water and bait therein and with the container disposed below the water level in the reservoir and having therein a submersible electric motor driven pump including a discharge pipe projecting upward above the water level in the reservoir, the container being provided with numerous side wall water inlet openings therein for the entrance of water from the reservoir exteriorly of the container into the latter, and with the water inlet openings being covered by a water filtering panel disposed inwardly of and against the inner surfaces of the side wall of the container. The upper end of the discharge pipe includes water jet discharge structure for directing jet discharges of water downwardly therefrom onto the surface of the water within the reservoir exteriorly of the container into thereby aerate the reservoir water and prolong the life of live bait therein.

2. Description of Related Art

Various different forms of water aerating structures heretofore have been provided such as those disclosed in U.S. Pat. Nos. 3,295,681, 3,800,462, 3,815,277, 4,255,360, 4,353,864 and 4,757,636. However, these previously known forms of water aerating structures do not include the overall structural and operational features of the instant invention which particularly well adapt the latter for use in aerating water within a live well or the like, whether the live well is built into a fishing boat, or comprises a portable live well such as may be formed by a conventional portable cooler when the aerator of the instant invention is used in conjunction therewith.

SUMMARY OF THE INVENTION

In accordance with the present invention a submersible electric motor driven pump is contained within a bucket-like container whose bottom wall is equipped with suction cups. The pump includes an inlet adjacent the bottom of the interior of the container and an outlet pipe extending outward through a side wall portion of the container and extending upwardly to a point elevated above the container top. The container is adapted to be received within a water and bait or fish containing reservoir partially filled with water to a level above the top of the container but below the upper end of the discharge or outlet pipe for the pump. The upper end of the discharge or outlet pipe for the pump includes water jet discharge structure for discharging jets of water downwardly therefrom onto the surface of the water within the reservoir exteriorly of the container and the container side walls include a large number of water inlet openings formed therethrough whereby water within the reservoir exteriorly of the container may enter the interior of the container through the side wall thereof.

Further, a single panel of water filtering material is flexed into a generally cylindrical configuration and telescoped into the container and is disposed in surface-to-surface engagement with the inner surfaces of the container side wall disposed about the inlet openings. Also, a resilient panel is provided and flexed into a generally cylindrical configuration and telescoped into the cylindrical filter panel with the resiliency of the resilient panel tending to increase the radius of curvature thereof and thereby exerting an outward force on the inner surfaces of the cylindrical filter panel such that the outer surfaces of the filter panel are held tight against the inner surface portions of the side walls of the container disposed about the water inlet openings formed therethrough, the resilient panel also being provided with openings formed therethrough registered with the water inlet openings formed in the side wall of the container.

The large number of water inlet openings formed in the side wall of the container have a total cross-sectional area many times greater than the cross-sectional area of the inlet of the electric motor driven pump (normally protected by a relatively a small area filtering panel) and the portions of the filtering panel disposed over the water inlet openings will not clog with debris and require periodic cleaning throughout the day if the bait within the water contained within the reservoir comprises live shrimp or live fish.

The main object of this invention is to provide an apparatus which may be utilized to effectively aerate water within a fishing bait well independent of whether the bait well comprises a portable bait well or is built into a fishing boat.

Another object of this invention is to provide a water aeration apparatus in accordance with the preceding objects and which may be readily utilized to transform a conventional portable cooler into a portable bait well including water aeration structure.

Yet another important object of this invention is to provide a water aeration apparatus for use in conjunction with a bait well and including vast water filtering capacity to eliminate the need for periodically having to clean a water filter throughout a fishing day when live bait are being used as bait.

Another very important feature of this invention is to provide a bait well water spray aerator in accordance with the preceding objects and incorporating structural components which are already being mass produced and which therefore may be assembled and marketed at a low cost and substantially without fear of component failure.

A final object of this invention to be specifically enumerated herein is to provide a bait well water spray aerator in accordance with the preceding objects and which will conform to conventional forms of manufacture be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a typical form of inexpensive portable cooler which has been transformed into a bait well in accordance with the present invention, portions of near side wall portions of the cooler being broken away and illustrated in section to illustrate the container and water outlet pipe portions of the water aerating mechanism disposed within the cooler;

FIG. 2 is an enlarge fragmentary vertical sectional view taken substantially upon the plane indicated by the section line 2—2 of FIG. 1;

FIG. 3 is a top plan view of the container and water pump structure of the instant invention with the top cover of the container removed;

FIG. 4 is a fragmentary elevational view of an upper portion of the interior of the cooler illustrating a modified form of water jet discharge structure and attendant water pump discharge pipe which may used in conjunction with the instant invention;

FIG. 5 is an enlarged fragmentary vertical sectional view take substantially upon the plane indicated by the section line 5—5 of FIG. 4.

DESCRIPTION OF THE PREFERRED EMBODIMENTS

Referring now more specifically to the drawings, the numeral 10 generally designates a conventional form of insulated cooler including an upwardly opening reservoir 12 and a removable cover 14 closing the upper portion of the reservoir 12.

The bait well water spray aerator of the instant invention is referred to in general by the reference number 16 and includes a plastic bucket-type container 18 including a generally cylindrical side wall 20, a bottom wall 22 closing the bottom of container 18 and removable top wall 24 closing the top of the container 18.

The bottom wall 22 includes depending suction cups 26 supported therefrom through the utilization of fasteners 28 and the container 18 may thus be supported from the upper surface of the bottom wall 30 of the reservoir 12 in any suitable location on the bottom wall 30. The reservoir 12 may be filled with water to a level 32 disposed above to top wall 24 and the lower end of a submersible electric motor driven water pump assembly referred to in general by the reference numeral 34 is secured to the upper surface of the bottom wall 22 of the container 18 through the utilization of fasteners 36. The water pump assembly 34 includes a removable slotted lower housing portion 38 defining a restricted cross-sectional area water inlet and an upper laterally directed water outlet 40 opening toward the inner surface of the side wall 20 of the container 18. A water outlet or discharge pipe 42 includes an inlet end 44 coupled to the water outlet 40 and snugly extending through an opening (not shown) formed in the side wall 20. The pipe 42 extends substantially vertically upward from the inlet end 44 and includes a capped upper outlet end 46 provided with downwardly and outwardly inclined water outlet openings 48 for downwardly spray discharging jets of water onto the surface water within the reservoir 12 exteriorly of the container 18 at the water level 32.

The electric drive motor portion of the assembly 34 includes insulated electrical conductors 50 operably connected thereto at one pair of corresponding ends and the conductors 50 extend upwardly through an opening 52 provide therefor in the removable top wall 24. The ends of the conductors 50 remote from the assembly 34 are provide with electrically conductive clamps 53 whereby the clamps 53 may be utilized to electrically connect the electric motor to a suitable source of electrical potential such as a storage battery (not shown).

The filtering media is supported from an exterior wall for removal of the filtering media from the container independent of removal of said unitary electric drive motor and water pump assembly from said container. The unitary electric drive motor and water pump assembly are entirely received within the container in freely spaced relation relative to the exterior wall and the water filtering media.

The side wall 20 of the container 18 includes a large number of water inlet openings 54 formed therethrough whereby water from within the receptacle 12 exteriorly of the container 18 may enter the latter and be pumped therefrom by the pump assembly 34 and out the water outlet openings 48 back into the water within the receptacle 12 exteriorly of the container 18.

The total cross-sectional area of the water inlet openings 54 is many times greater than the effective cross-sectional area defined by the water inlet defining slotted lower housing portion 38 of the assembly 34.

Mounted within the container 18 is a thick panel 60 of water filtering material. The panel 60 is flexed into a generally cylindrical configuration with abutting circumferential end edges 62 such that the panel 60 may be snugly telescoped within the container 18 against the inner surface portions of the side wall 20 disposed about the water inlet openings 54. In addition, the end edges 62 are suitably notched (not shown) to receive the inlet end 44 of the pipe 42 therebetween.

Still further, a flexible resilient panel 66 is provided and flexed into a generally cylindrical configuration with overlapping circumferential ends 68 and 70 and is telescoped into the cylindrically shaped panel 60, the resiliency of the panel 66 tending to increase the radius of curvature thereof and thereby enabling the panel 66 to exert an outward biasing force on the panel 60 so that the outer surfaces thereof may be maintained tightly seated against the inner surfaces of the side wall 20 disposed about the openings 54. Further, a predetermined circumferential portion of the panel 60 includes a downwardly opening notch 74 for receiving the inlet end 44 therethrough and the panel 60 includes a large number of openings 76 formed therethrough registered with the openings 54. The notch 74, the notched end edges 62 and 64 and the side wall opening provided for the inlet end of the pipe 42 all serves to establish proper registry of the openings 54 and 76 and to position the end edges 62 and 64 opposite the overlapped ends 68 and 70 of the resilient panel 66.

With attention now invited more specifically to figures 4 and 5 of the drawings, a modified form of water outlet or discharged pipe 42' is illustrated. The pipe 42' includes a flexible mid-portion 43, an outlet end 45 and inlet end (not shown) corresponding to the inlet end 44 and which is removably engaged with the water outlet 40 in lieu of the inlet end 44 of the pipe 42. The inlet end of the pipe 42' is, however, reasonably rigidly attached to the water outlet 40 and therefore functions in the same manner as the inlet end 44 for keying the side wall 20, the panel 60 and the resilient panel 66 relative to each other and also for stabilizing the water pump assembly 34 relative to the container 18.

Accordingly, in the modified form of the invention, operation of the water pump assembly 34 will cause water under pressure to be forced through the pipe 42' to the outlet end 45 thereof.

In addition to the pipe 42', a log-type manifold 47 is provided including an open inlet end 49 and a closed end 51. The outlet end 45 is coupled to the inlet end 49 of the manifold 47 and the latter includes longitudinally spaced water jet discharge ports 53 for discharging jets of water therethrough. In addition, a pair of clamps 55 are mounted to opposite ends of the manifold 47 and include suction cups 57 supported therefrom, whereby the manifold 47 may be suction cup mounted from an upper wall portion of the reservoir 12. It is to be noted that the manifold 47 is cylindrical and that, although frictionally gripped by the clamps 55, the manifold pipe and the clamps 55 are relatively rotable. Accordingly, the direction of discharge of water jets from the manifold 47 may be adjusted.

In operation, the reservoir portion 12 of the cooler 10 may have water disposed therein to the water level 32 and such water may have live shrimp or live fish therein to be used as fishing bait.

The assembly 16 then may be placed into the receptacle 12 and anchored to the bottom wall 30 thereof through the utilization of the suction cups 26 and the clamps 54 may be electrically connected with a suitable source of electrical potential in order to operate the electric motor of the assembly 34. Accordingly, water from the interior of the reservoir exteriorly of the aerator 16 will enter the container 18 through the openings 54 and 76 as well as the panel 60 and be pumped therefrom by the assembly 34 outwardly of the water outlet openings 48 in order to aerate the water within the receptacle 12 exteriorly of the aerator 16. Of course, the aerator 16 may be placed within a bait well built into a boat or even may be used as a temporary aerator for a fish aquarium. Further, the aerator may be used in any form of live box to aerate the water therein.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention.

What is claimed as new is as follows:

1. A water aerator for a water containing reservoir, said aerator including a hollow open top container for disposition within a reservoir at least partially filled with water, said container including exterior wall means having a plurality of inlet openings formed therethrough for admitting water from said reservoir into said container and of a first total predetermined effective water flow cross-sectional area, a unitary electric drive motor and water pump assembly freely removably received within said container and including restricted cross sectional area water inlet means and a water outlet, said water inlet means having a second total predetermined effective water flow cross-sectional area, said first cross-sectional area being at least several times as great as said second cross-sectional area, said container exterior wall means including water filtering media removably supported therefrom and operatively associated therewith for filtering water passing through said inlet openings from said reservoir exteriorly of said container into the latter, said filtering media being supported from said exterior wall means for removal of said filtering media from said container independent of removal of said unitary electric drive motor and water pump assembly from said container, said unitary electric drive motor and water pump assembly being entirely received within said container in freely spaced relation relative to said exterior wall means and said water filtering media, said water outlet having the inlet end portion of discharge conduit means operatively associated therewith for receiving water from said water outlet and said discharge conduit means including an outlet end portion disposed exteriorly of said container and at an elevation higher than said inlet openings equipped with water spray discharge means for spray discharge of water therefrom onto the surface of the water in said reservoir exteriorly of said container.

2. The aerator of claim 1 wherein said wall means includes interior and exterior surface areas disposed about said inlet openings said filtering media overlying said interior surface areas.

3. The aerator of claim 2 wherein said filtering media comprises at least one flexible filter panel means extending across said inlet openings.

4. The aerator of claim 3 wherein said exterior wall means comprises a generally cylindrical wall portion, said flexible filter panel means being flexed into a generally cylindrical shape to conform to the contour of said inner surface portions.

5. The aerator of claim 4 including a flexible resilient panel member flexed into a generally cylindrical shape and telescoped into said filter panel means with the resiliency of said resilient panel member tending to increase the radius of curvature of said resilient panel member and thus exerting an outward force on said filter panel means to bias the latter into tight surface-to-surface engagement with said interior surface areas, said resilient panel member having openings formed therethrough registered with the first mentioned openings.

6. The aerator of claim 1 wherein said discharge conduit extends through said wall means.

7. The aerator of claim 6 wherein said exterior wall means includes interior and exterior surface areas disposed about said inlet openings, said filtering media overlying said interior surface areas, said filtering media comprising at least one flexible filter panel means extending across said inlet openings, said discharge conduit also extending through said filter panel means.

8. The aerator of claim 1 wherein said container includes exterior suction cup means for removable suctions support of said container from an inner surface portion of said reservoir below the water level therein.

9. The aerator of claim 1, wherein said outlet end portion comprises an upstanding pipe section, said water spray discharge means including means operative to discharge a plurality of water jets therefrom in a downward direction from an upper portion of said pipe section.

10. The aerator of claim 1 wherein said outlet end portion comprises a generally horizontal log-type manifold and said water spray discharge means includes discharge means operative to discharge a plurality of water jets from said manifold at points spaced longitudinally therealong in a downward direction.

11. In combination, a water containing reservoir for fish or bait and including a bottom wall, a water aerator including a hollow container supported from said bottom wall, said container including exterior walls means having a plurality of inlet opening formed therethrough for admitting water from said reservoir into said container and of a first total predetermined effective water flow cross-sectional area, a unitary electric drive motor and pump assembly freely removably received within said container and including restricted cross-sectional area water inlet means and a water outlet, said water inlet means having a second total predetermined effective water flow cross-sectional area, said first cross-sectional area, being at least several times as great as said second cross-sectional area, said container exterior wall means including water filtering media removably supported therefrom and operatively associated therewith for filtering water passing through said inlet openings from said reservoir into said container said filtering media being supported from said exterior wall means for removal of said filtering media from said container independent of removal of said unitary electric drive motor and water pump assembly from said container, said unitary electric drive motor and water pump assembly being entirely received within said container in freely spaced relation relative to said exterior wall means and said filtering media, said water outlet having an inlet end portion of discharge conduit means operatively associated therewith for receiving water from said water outlet and said discharge conduit means including an outlet end portion disposed exteriorly of said container and at an elevation higher than said inlet openings, said outlet end portion being equipped with water spray discharge means for spray discharge of water therefrom downward onto the surface of the area of water within said reservoir exteriorly of said container.

12. The combination of claim 11 wherein said exterior wall means includes interior and exterior surface areas disposed about said inlet openings, said filtering media overlying said interior surface areas.

13. The combination of claim 12 wherein said filtering media comprises at least one flexible filter panel means extending across said inlet openings.

14. The combination of claim 13 wherein said exterior wall means comprises a generally cylindrical wall portion, said flexible filter panel means being flexed into a generally cylindrical shape to conform to the contour of said inner surface portions.

15. The combination of claim 14 including a flexible resilient panel member flexed into a generally cylindrical shape and telescoped into said filter panel means with the resiliency of said resilient panel member tending to increase the radius of curvature of said resilient panel member and thus exerting an outward force on said filter panel means to bias the latter into tight surface-to-surface engagement with said interior surface areas, said resilient panel member having openings formed therethrough registered with the first mentioned openings.

* * * * *